United States Patent
Haastrup

(10) Patent No.: US 8,836,866 B2
(45) Date of Patent: Sep. 16, 2014

(54) METHOD AND SYSTEM FOR ADAPTING FILM JUDDER CORRECTION

(75) Inventor: Henrik Haastrup, Struer (DK)

(73) Assignee: Bang & Olufsen A/S, Struer (DK)

( * ) Notice: Subject to any disclaimer, the term of this patent is extended or adjusted under 35 U.S.C. 154(b) by 354 days.

(21) Appl. No.: 13/138,565

(22) PCT Filed: Mar. 25, 2010

(86) PCT No.: PCT/EP2010/053913
§ 371 (c)(1),
(2), (4) Date: Sep. 6, 2011

(87) PCT Pub. No.: WO2010/108981
PCT Pub. Date: Sep. 30, 2010

(65) Prior Publication Data
US 2011/0317075 A1    Dec. 29, 2011

(30) Foreign Application Priority Data

Mar. 25, 2009 (DK) ................................ 2009 00408
Apr. 15, 2009 (EP) .................................... 09157945

(51) Int. Cl.
H04N 5/57 (2006.01)
H04N 5/14 (2006.01)
H04N 7/01 (2006.01)
H04N 5/21 (2006.01)

(52) U.S. Cl.
CPC .............. *H04N 7/0135* (2013.01); *H04N 5/21* (2013.01); *H04N 7/0127* (2013.01); *H04N 7/0132* (2013.01)
USPC ........................................... 348/687; 348/701

(58) Field of Classification Search
USPC .................. 348/687, 701, E05.119, E05.062
See application file for complete search history.

(56) References Cited

U.S. PATENT DOCUMENTS

| 2009/0268089 A1 | 10/2009 | Mori et al. |
| 2010/0013991 A1 | 1/2010 | Miyazaki et al. |
| 2010/0034272 A1 * | 2/2010 | Miyazaki et al. ........ 375/240.16 |

FOREIGN PATENT DOCUMENTS

| EP | 2046029 A2 | 4/2009 | |
| WO | WO-2008035474 A1 | 3/2008 | |
| WO | WO-2008050502 A1 | 5/2008 | |
| WO | WO/2008102826 * | 8/2008 | ............... H04N 5/66 |
| WO | WO-2009034486 A2 | 3/2009 | |

OTHER PUBLICATIONS

International Search Report.

* cited by examiner

*Primary Examiner* — Joseph Ustaris
*Assistant Examiner* — William Adrovel
(74) *Attorney, Agent, or Firm* — Harness, Dickey & Pierce, P.L.C.

(57) ABSTRACT

A TV or monitor with a sensor sensing radiation or light from the surroundings, where a controlling unit, on the basis of the sensed radiation or parameters of a video signal, frame rate converts an original video signal to an up converted video signal by determining additional images for the video signal, the additional images being determined on the basis of the determined radiation/light or parameter of the video signal in order to relatively reduce frame rate conversion generated artifacts when the radiation or light intensity is higher.

8 Claims, 2 Drawing Sheets

METHOD AND SYSTEM FOR ADAPTING FILM JUDDER CORRECTION

Figure 1:
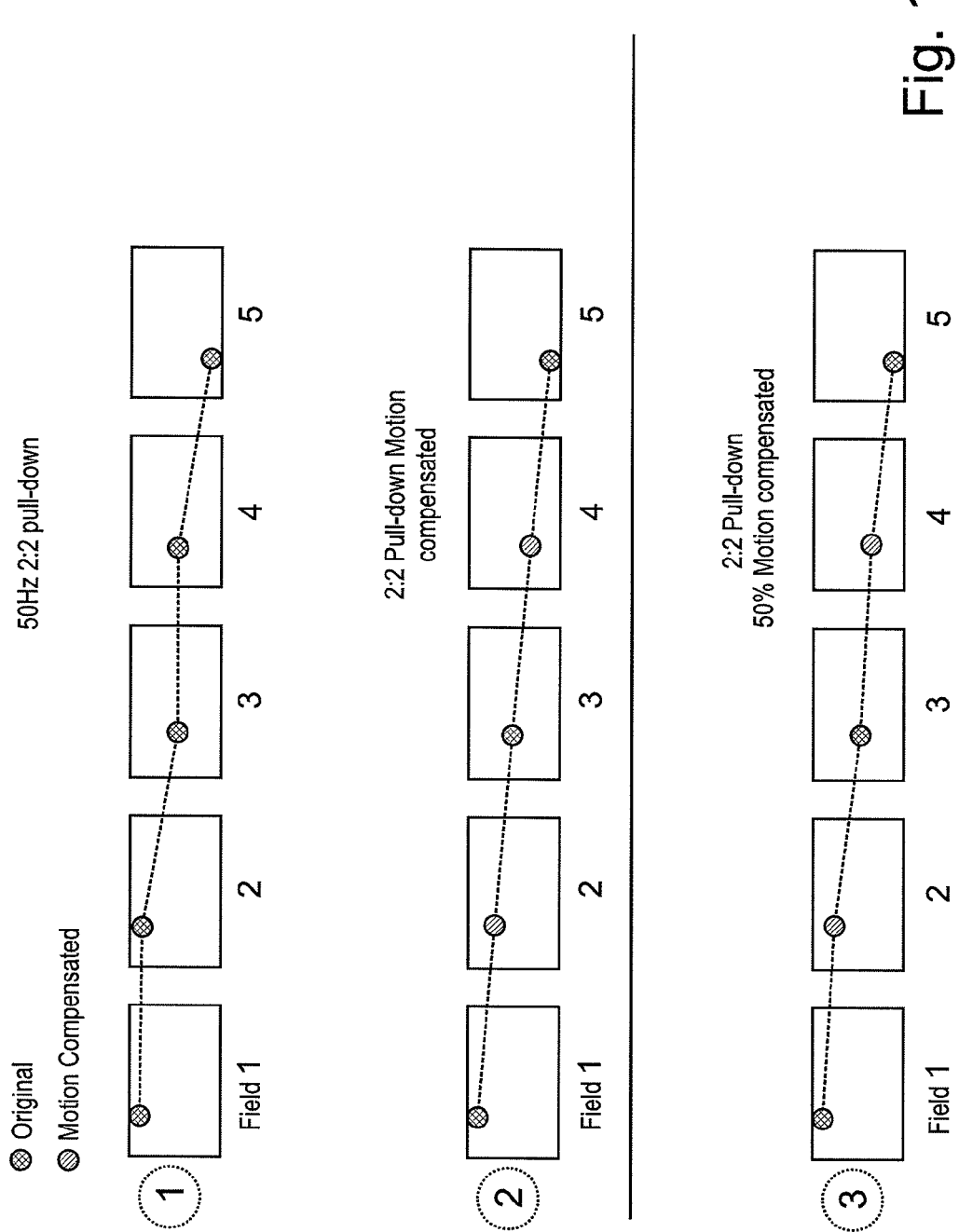

The present method relates to a method and a system for adapting film judder correction or motion compensation and in particular to the adaptation of film judder on the basis on illumination or light intensity variables or conditions.

Originally, movies were recorded on an expensive single-use medium, whereby it was desired to use as little as possible of this medium. Thus, movies are recorded with only 24 images or frames per second.

Providing a movie on a 50 Hz TV, thus, may be obtained by e.g. providing each image or frame two times in a row, whereby the movie is slightly speeded up. Providing the movie on a 60 Hz TV would be performed by providing every second image two times in a row and the other images three times in a row.

This, however, provides a juddering in that the movements of elements in the images/frames, such as during camera movements or movements within the field of view, will seem to not move evenly but with abrupt, sharp position changes, much like movement in front of a stroboscope.

The same problem is seen when converting a 50/60 Hz video signal up to 100/120 Hz, which is the desired norm on today's TV's/monitors.

This disadvantage has been attempted removed by, in stead of providing an image/frame more than once, determining a new image/frame in which positions of moving elements have been calculated, thus simulating a movie recorded with a higher frame rate.

It has been found, however, that this type of compensation or determination of interleaved images/frames, is not without disadvantages. For example, it has been found disadvantageous that the compensation has been fixed, in that this desirably should vary under different circumstances.

In a first aspect, the invention relates to a system for providing an altered video signal, the system comprising:
  means for receiving or providing a first video signal comprising a number of images or frames,
  means for determining, from two or more consecutive images/frames of the first video signal, one or more additional images/frames to be provided between the consecutive images/frames and being adapted to:
    identify positions, in the two or more consecutive images/frames, of corresponding elements in the two or more consecutive images/frames,
    determine a position of a corresponding element in each additional image/frame,
  means for receiving the images/frames of the first video signal and the additional images/frames and for outputting the altered video signal,
the system further comprising means for generating a value from at least one of: a user definable setting, the first video signal, the altered video signal or surroundings to the display or monitor,
the determining means being adapted to receive the value and determine the position on the basis of the value.

In the present context, a video signal is a signal, file or any other type of information, on a carrier, transmitted or not, comprising a plurality of images or frames to be provided sequentially in a given order, such as on a display or monitor, or to a transmitting/receiving device, to or from a storage device, or the like.

In the following, "image" and "frame" will be interchangeable terms in that these terms will cover the individual information items or packages to be individually displayed when displaying or playing the video.

Naturally, the first video signal may be provided in any manner, such as derived from a camera, a storing medium, a receiver of any kind e.g. (network, cable, satellite disc, set top box, DVD, VHS, hard drive, RAM/ROM/PROM/EPROM/EEPROM/FLASH or the like).

Usually, the time difference between providing of each of the images of the first video signal should be allowed to remain essentially unaltered. Altering this time will speed up or slow down e.g. movement seen in the video.

Thus, providing the additional images/frames normally will be e.g. a frame rate conversion increasing the number of images/frames to be provided per second when displaying the video. Alternatively, the additional image/frames may be used for "slowing down" the video while maintaining the original frame rate.

In this context, the additional images are images different from the original images of the first video, and the additional images are provided in addition to those of the first video. Usually, one additional image is provided for each image of the first video signal, but more than one or less than one, such as one for each two, three, etc. of the original images, or two, three or more for each original image, may be provided.

Usually, the additional images are determined or generated from two adjacent original images of the first video, and it is subsequently positioned between these two images. Alternatively, more than those two original images may be used for generating a better additional image.

Normally, an additional image is generated by identifying, in the two or more original images forming the basis of the generation, one or more (normally many) elements in the images as well as their positions. In this context, corresponding elements will be parts of the images being present in all relevant images and which represent, normally, physical objects images in the images (persons, limbs, objects or the like) which have the same overall shape, colour, contrast, or the like in each original image (and thus correspond). A number of manners exist of identifying such objects or elements. Each such object or element is determined, as is the position thereof in each image. When the positions are not identical in the images of the first video, a new position is to be determined in the additional image, as is the background at the element at this position. It is noted that the background may not be directly known from the original images, whereby this is estimated, which gives rise to some of the artefacts seen.

From the images of the first video and the additional images, the altered video signal is generated, and this may be used in any manner desired as usual in video: viewing, transmitting, receiving, storing or the like.

According to the invention, the system further comprises means for generating a value from at least one of: a user definable setting, the first video signal, the altered video signal or surroundings to the display or monitor.

A user definable setting is a value or the like which a user may define. One manner of defining this is that the user enters this value or setting into an apparatus performing the method. This setting may be stored in a storage or be entered or altered continuously. Preferably, this setting has to do with characteristics which the user desires of a video when displayed or played on the basis of a video signal, such as the altered video signal. Such characteristics may have to do with a degree of illumination or brilliance or other image settings, such as colour characteristics or contrast. Thus, the user definable setting may define further parameters of the radiation output by a display than those defined by the actual video signal.

According to the invention, the determining means will determine the position on the basis of the value, whereby different values preferably give rise to different positions being determined. Then, the user or the video signals will be able to affect the determination which hitherto has been fixed.

As an alternative or addition to the above determination of the value, the system may comprise a display or monitor for providing the altered video signal, the value being determined (optionally also) on the basis of a parameter determined on the basis of radiation output by the display/monitor during the providing of the altered video signal.

In addition, a value may be derived from the surroundings, such as from an intensity/brilliance/luminance of light in the surroundings, and/or from colour/wavelength contents thereof.

In one embodiment, the determining means is adapted to determine the position along a predetermined curve between the identified positions, the determined position having a distance, along the curve and to an identified position, based on the value.

A usual manner of determining the position of an element in an additional image is to estimate, pre-determine or otherwise obtain information relating to an assumed path or direction of movement of the element. This is performed on the basis of the positions in the images of the first video and possibly additional assumptions. Thus, a graph or curve may be determined along which the element moves in the images, and the position consequently determined along this curve and between the positions determined in the images of the first video.

The distance between the determined position and a position of one of the images of the first video may be along the curve/graph or simply a Euclidian distance between the positions when extrapolated into the same image. As will be described further below, different distances will give different amounts of the artefacts generated by the frame rate conversion.

In a particularly interesting embodiment, the generating means is adapted to determine or estimate a luminance, intensity and/or APL (Average Picture Level) from the first and/or altered video signal and/or the surroundings and generate the value on the basis of the determined or estimated luminance/intensity/APL. Also the colour or wavelength contents may be relevant. Thus, it is preferred that the luminance/intensity/APL is determined within a wavelength range visible to the human eye. Thus, the luminance/intensity/APL may be determined within a narrow wavelength range, such as on the basis of green light, or within a broader range.

It has been found that the amount of light impinging on the eye of a user is a factor in determining the amount of artefacts visible to the user. The more light is present or seen, the more obvious or visible are artefacts, whereby it is preferred that the determined position is determined closer to a position of an image of the first video, when the amount of light, the luminance/intensity/APL is higher. Naturally, this light may impinge on the user's eyes both from the surroundings and e.g. a TV/display/monitor providing the altered video.

In another embodiment, the generating means is adapted to determine or estimate a parameter from the first and/or altered video signal and generate the value depending on the determined or estimated parameter. Again, preferably, this parameter has to do with parameters of the images, such as brilliance, contrast, or the like. Again, the colour or wavelength contents may be relevant.

Preferably, the determining means is adapted to determine a first distance on the basis of a first value and a second distance on the basis of a second value, the first and second distances being distances from corresponding elements in one of the two or more consecutive images/frames, the first distance being smaller than the second distance when the first value indicates a higher luminance than the second value. Preferably, the one of the two or more consecutive images/frames is that to which at least one of the first and second distances is the lowest, due to the fact that the artefacts are suppressed independently of which of the original images, the new images are "approaching" position-wise or timing-wise.

Naturally, the means for outputting the altered video signal may be adapted to adapt the altered video signal to the user definable setting, such as a contrast, colour and/or brilliance setting of the video. Naturally, the outputting means may be adapted to output the video for viewing, transmission, storing or the like.

Preferably, the generating means are adapted to generate the value intermittently, with a predetermined frequency, or constantly, the determining means being adapted to, at all times, use the latest value. Thus, the value determination and the determination of the position and thereby the operation causing the artefacts, is truly adaptive and may be altered or changed at fixed intervals or whenever required or desired. Thus, the value may be constantly or intermittently updated or re-evaluated, and the additional images determined according to an altered parameter, if this parameter is changed.

In another aspect, the invention relates to a method of providing an altered video signal, the method comprising:
  receiving or providing a first video signal comprising a number of images or frames,
  determining, from two or more consecutive images/frames of the first video signal, one or more additional images/frames to be provided between the consecutive images/frames, the determining step comprising:
    identifying positions, in the two or more consecutive images/frames, of corresponding elements in the two or more consecutive images/frames, and
    determining a position of a corresponding element in each additional image/frame,
  generating the altered video signal from the images/frames of the first video signal by providing the additional images/frames between the pertaining images/frames of the first video signal,
the method further comprising the step of generating a value from at least one of: a user definable setting, the first video signal, the altered video signal or surroundings to the display or monitor,
where the determining step comprises determining the position on the basis of the value.

As mentioned above, the first video signal may be obtained or received in any manner, and the altered signal may be provided in any manner, such as for viewing, storing, transmission or the like.

The identification of the positions as well as the general providing of the new or additional images/frames is known apart from the part of determining the positions on the basis of a parameter which may vary.

As mentioned above, an alternative or addition to the generating step may be one where the altered video signal is output on a display or monitor and the value is determined (optionally also) on the basis of radiation output by the display or monitor while providing the altered video signal.

In one embodiment, the determining step comprises determining the position along a predetermined curve between the identified positions, the determined position being at a distance, along the curve and to an identified position, based on the value. Alternatively, the distance may be a Euclidian distance between the positions when interpolated into the same image.

In that or another embodiment, the generating step comprises determining or estimating a luminance, intensity and/or APL from the first and/or altered video signal and/or the surroundings and generating the value based on the determined or estimated luminance/intensity/APL.

Also, the generating step may comprise determining or estimating a parameter from the first and/or altered video signal and generating the value based on the determined or estimated parameter. This parameter may be related to parameters of images/frames, such as a brilliance, light intensity (such as a mean light intensity determined over a predetermined period of time, such as 1, 2, 5, 10 seconds or more), or a contrast of the video/images/frames. In addition or alternatively the wavelength contents of the signal may be used.

In one embodiment, the determining step comprises determining a first distance on the basis of a first value and a second distance on the basis of a second value, the first and second distances being distances from corresponding elements in one of the two or more consecutive images/frames, the first distance being smaller than the second distance when the first value indicates a higher luminance than the second value. As mentioned above, the distance normally is less than half that between the two original images, so that the distance is between the determined position and that of the original positions which is the closest to the determined position. The smaller the difference, the less visible will the artefacts be, and the larger will the judder be.

In one embodiment, the step of outputting the altered video signal comprises adapting the altered video signal to the user definable setting, such as colour contents, contrast, brilliance or the like.

Finally, preferably, the generating step comprises generating the value intermittently, with a predetermined frequency, or constantly, the determining step comprising determining the position on the basis of the latest received value. This frequency may be set to any desired value, such as 1, 2, 3 times per second or minute or more. Alternatively, the determination is constant, meaning that the value is determined as often as possible, taking into account the processing power of a processor performing the determination as well as, normally, other functions, which naturally will also require a part of the processing power.

Figure 2:
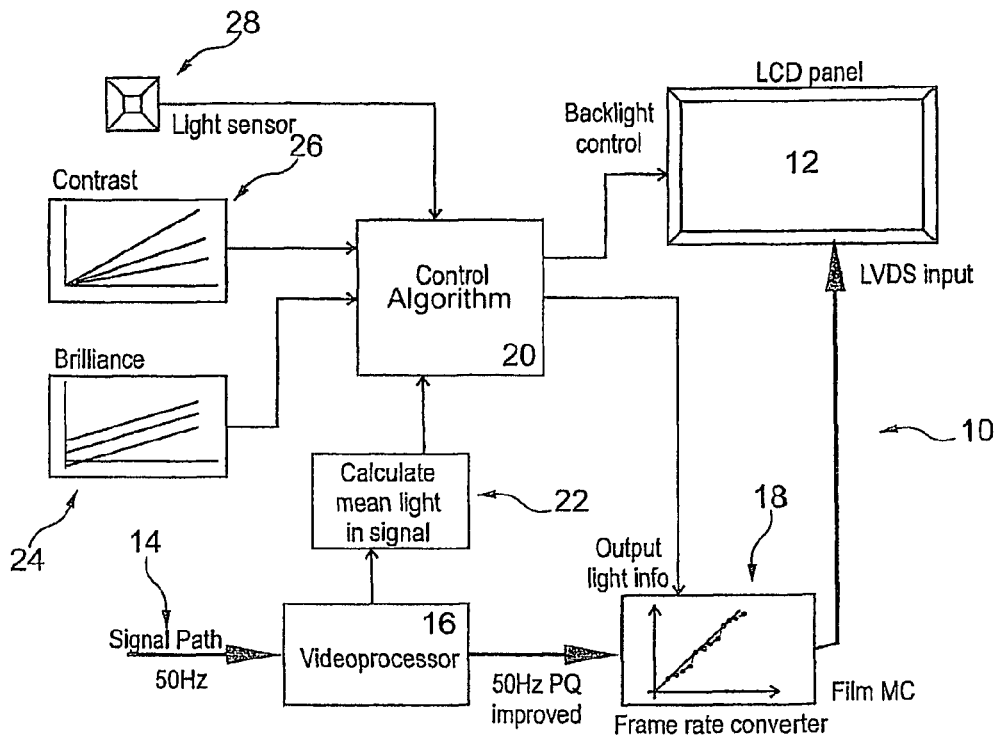
Figure 3:
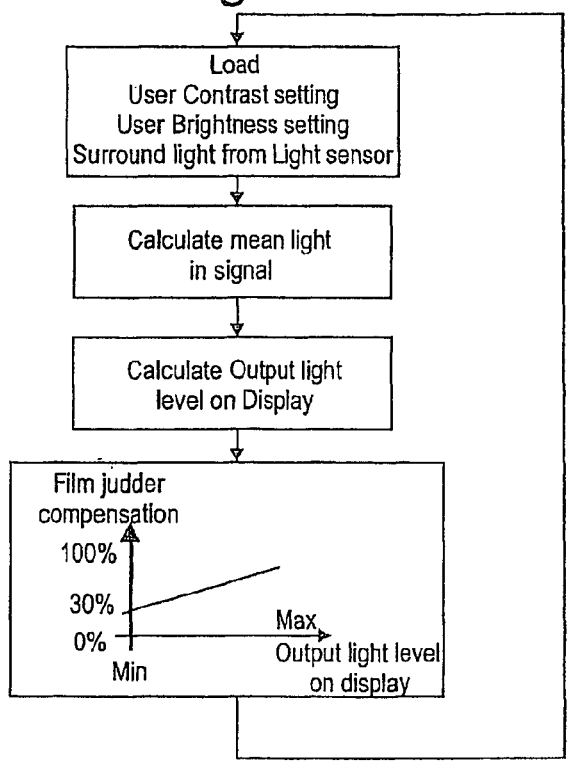

In the following, preferred embodiments of the invention will be described with reference to the drawing, wherein:

FIG. 1 illustrates different manners of providing a 24 Hz movie on a 50 Hz TV, FIG. 2 illustrates the main components of a judder compensated TV, and FIG. 3 is a flow diagram illustrating the principles of the TV of FIG. 2.

As mentioned above, and as seen in FIG. 1, the providing of a 24 Hz movie on a 50 Hz TV, monitor, display or the like, originally has been performed by actually speeding up the movie and providing the images at 25 Hz—and thus each image twice.

In FIG. 1, line 1 the situation is described where each image is illustrated twice. In the images, a circular element, such as a ball, moves downwardly, such as if the ball falls. In the individual original images, the ball is positioned further and further downward. It is seen on the dotted line that abrupt position changes are seen when watching the movie.

In line 2, a standard motion compensation is performed whereby, instead of providing each original image twice, interleaved images (seen as less black balls) are derived and provided between each set of neighbouring original images. As the images are to be provided equidistantly in time, the standard motion compensation will determine a position of the circular element directly between those of the original images.

Usually, the position is simply determined at a centre of a line stretching between the positions of the original images (dotted line), but in principle any curve could be used, such as if tracking of the element was performed and it was found to not follow a straight line.

In this context, the distance between the positions could be the Euclidian distance between the positions when transposed to the same image/frame.

According to the invention, this compensation and position determination will be adaptable in that it has been found that the judder or motion compensation under some conditions is more visible and problematic than at other times.

Thus, a value is determined which will control the motion compensation, as is illustrated in FIG. 1. In FIG. 1, line 3, it is also seen that the interleaving or additional images/frames are provided, but the position of the element in the image is now selectable on the basis of the variable.

The variable may relate to a number of factors, but it has been found that judder or motion compensation, or rather the artefacts caused thereby, is more pronounced or visible, when the user's eyes receive more light. Thus, the more light in the surroundings of the TV/monitor and/or the more light is emitted by the TV/monitor, the more motion compensation caused artefacts can the eye or the user detect. Thus, the less light, the less artefacts can be detected, and the closer the compensation can get to the known motion compensation where the determined position is at the middle between the positions of the two original, neighbouring images/frames. The more light, the closer the determined position should be to that of one of the original images/frames in order to keep the artefacts to a tolerable level.

Consequently, the higher the light intensity at or from the TV/monitor, the closer the position preferably is to either the image/frame to be provided directly before the intermediate image/frame or that to be provided directly after this image/frame.

Thus, in general, the inventive motion/judder compensation algorithm will determine a position not predetermined and not always the same but varying on the basis of a parameter provided during use.

Then, any known or future compensation algorithm or method may be used, as long as it allows the position to be determined or altered. Different methods or algorithms exist which attempt to in different manners avoid some of the artefacts (halos or break-ups) generated by these compensation methods.

Naturally, the compensation may be re-evaluated constantly or intermittently with predetermined time interval(s), such as if the conditions of viewing the video changes or if the video itself changes.

FIG. 2 illustrates the main components 10 of a TV or monitor 12 adapted to receive a video or feed of a first frame rate, such as 24 Hz or 50/60 Hz and for providing to a user an adapted video or feed at a second, higher, frame rate, such as 100/120 Hz.

The original or first video feed 14 is received by a video processor 16, which forwards the video feed, optionally amended, to a frame rate converter 18 increasing the frame rate from e.g. 50 Hz to e.g. 100 Hz. This frame rate converter 18 may be a PNX 51xx from NXP.

The frame rate converted video is then fed from the frame rate converter 18 to the TV 12 for viewing by a user.

In addition, a control algorithm 20 is provided for controlling the frame rate conversion of the frame rate converter 18.

A signal or value is generated by the control algorithm 20, and the conversion of the converter 18 is performed accordingly.

The converter 18 is adapted to determine, from a number of consecutive images/frames in the received video signal, one or more new images/frames to be provided between two of the consecutive images/frames. In the consecutive images, corresponding elements, such as persons, buildings or other elements imaged in the images/frames, are identified, as are positions thereof. Then, for the one or more new images, positions are determined for these elements, and the new images are generated on the basis of these positions. The actual generation of these images is known to the skilled person.

According to the invention, these positions are determined also on the basis of the information received, such as from the control algorithm. Thus, on the basis of different information received, different positions are determined.

In a simple embodiment, the position of an element is determined along a straight line between the positions of that element in the original consecutive images/frames. The position determined may be right at the middle between the positions of the consecutive images or may be provided closer to the position of one of the consecutive images.

Naturally, only the two closest images/frames (in the time sequence of providing the images/frames as video) may be used for the position determination, or a larger number may be used in order to get e.g. a better accuracy of the position determination.

The straight line may be replaced by any curve, as it may be assumed that the elements of the images/frames do not move along straight lines or within particular planes. Thus, more complex curves may be determined, and the position then determined along such more complex curves. The shape of the curves may be predetermined, assumed or determined or derived from the positions in the consecutive images.

In order to obtain larger or smaller differences between the positions of the elements of the new images and the original images, the distance, along the curve/line or simply between the element in the new and one of the original images (on which the determination of the new image is based) is varied. Naturally, the distance may be determined in relation to that of an original image to be provided before the new image in question or one to be provided after the new image.

In fact, the derived parameter may, instead of a distance related parameter, be seen as a time related parameter describing which point in time, in the time period between the two adjacent, original images/frames, the new image/frame is to represent. A point in time directly between the points in time of the original images would represent the standard motion compensation, and a point in time closer to any of the two original images would represent a lower motion compensation and thus a resulting lower amount of artefacts.

In the system of FIG. 2, the algorithm 20 receives information 22 relating to a mean light signal or light intensity of the signal 12 received by the processor 16 or output therefrom. In addition, the algorithm receives information relating to the settings (user defined) of brilliance 24 and contrast 26 of the TV/monitor 12 as well as information relating to the ambient light settings or illumination from a light sensor 28 positioned so as to provide this information. This information may also be used for determining or setting an illumination setting of the TV/monitor in order to adapt it to the light conditions of the surroundings.

The settings 24/26 may be used for, in the TV/monitor, adapt the video signal from the converter 18 to the user's preferences or characteristics of the TV/monitor. Nevertheless, this information is also useful for the adaptation of the video conversion.

Thus, an amount of information relating to the amount of light which the user's eyes see is provided and forwarded to the algorithm 20.

In operation, see FIG. 3, the algorithm 20 will continuously or intermittently receive the information described and forward a value or other information to the converter 18 in order to adapt the conversion of the video signal to the light conditions. In addition, optionally the output level of the TV/monitor 12 may be determined and set e.g. on the basis of the illumination or irradiation of the surroundings, based on the output of the sensor 28.

Thus operation may be performed more or less often. Presently, it is preferred that this determination and adaptation is performed each 20-400 ms, but it may just as well be performed more often or more seldom.

Also, the actual adaptation of the compensation of converter 18, i.e. the distance difference to the usual central position, may be varied under different circumstances. Presently, it is preferred that the distance may vary between 30 and 70%, where 0% is no motion compensation (FIG. 1, line 1), and 100% is full motion compensation (FIG. 1, line 3). The preventing of the motion compensation to reach 100% is a tribute to the producers of movies who sometimes also when not required, provide the movies with artefacts so that it looks as if the movie was made with the original technology. Naturally, the method could allow any percentage of motion compensation, and the user might even be allowed to select these limits himself.

It is noted that also other types of information relating to the lighting or illumination settings may be useful, such as the wavelength contents thereof. Thus, it is preferred that the intensity/illumination is determined within the wavelength range visible with the human eye. In addition, it may be taken into account whether the illumination is constant or varying, as the human eye has a delay in adapting to changing illumination (pupil dilation), and this delay may be taken into account in the determination.

Naturally, the present method and algorithm will work on any type of up conversion of video frame rate, from any frequency to any frequency, as well as any type of TV/monitor/computer/PDA/laptop etc.

It is noted that some frame conversion algorithms may not operate with distances, but will still define a position of the element in the new image, whereby a distance will be inevitable and easily determinable.

The sensor 28 may be positioned anywhere, but it is presently preferred that it is fixed to the TV/monitor and is directed generally in the direction of the screen of the TV/monitor so as to point toward the usual viewing position of the user. Alternatively, it may be positioned so as to view the scenery (TV and its surroundings) actually viewed by the user.

The invention claimed is:

1. A system for providing an altered video signal, the system comprising:
   a video processor configured to receive or provide a first video signal comprising a number of images or frames;
   a converter configured to,
   determine, from two or more consecutive images/frames of the first video signal, one or more additional images/frames to be provided between the consecutive images/frames, identify positions, in the two or more consecutive images/frames, of corresponding elements in the two or more consecutive images/frames, determine a position of a corresponding element in each additional image/frame, and receive the images/frames of the first video signal and the additional images/frames, and output the altered video signal;

a TV, monitor or display configured to provide the altered video signal; and a controller configured to generate a value from at least one of, a user defined brilliance or illumination setting, a user defined contrast setting, a determined or estimated luminance, intensity or Average Picture Level from the first video signal, and an estimated output light level of the altered video signal on the TV, monitor or display, the converter being configured to receive the value and determine the position on the basis of the value and along a predetermined curve between the identified positions, the determined position having a distance, along the curve and to an identified position, between 30% and 70% of a total distance along the curve, wherein 0% corresponds to no motion compensation and 100% corresponds to full motion compensation.

2. The system according to claim 1, wherein the converter is configured to determine a first distance on the basis of a first value and a second distance on the basis of a second value, the first and second distances being distances from corresponding elements in one of the two or more consecutive images/frames, the first distance being smaller than the second distance when the first value indicates a lower output level than the second value.

3. The system according to claim 1, wherein the TV, monitor or display is configured to adapt the altered video signal to the user definable setting.

4. The system according to claim 1, wherein the controller is configured to generate the value intermittently, with a predetermined frequency, or constantly, and the converter is configured to, at all times, use the latest received value.

5. A method of providing an altered video signal, the method comprising:

receiving or providing a first video signal comprising a number of images or frames;

determining, from two or more consecutive images/frames of the first video signal, one or more additional images/frames to be provided between the consecutive images/frames, the determining comprising, identifying positions, in the two or more consecutive images/frames, of corresponding elements in the two or more consecutive images/frames, and determining a position of a corresponding element in each additional image/ frame;

generating the altered video signal from the images/frames of the first video signal by providing the additional images/frames between the pertaining images/frames of the first video signal;

providing the altered video signal on a TV, display or monitor; and generating a value from at least one of, a user defined brilliance or illumination setting, a user defined contrast setting, a determined or estimated luminance, intensity and/or Average Picture Level from the first video signal, and an estimated output light level of the altered video signal on the TV, display or monitor, display or monitor, wherein the determining comprises determining the position on the basis of the value and along a predetermined curve between the identified positions, the determined position having a distance, along the curve and to an identified position, between 30% and 70% of a total distance along the curve, wherein 0% corresponds to no motion compensation and 100% corresponds to full motion compensation.

6. The method according to claim 5, wherein the determining comprises determining a first distance on the basis of a first value and a second distance on the basis of a second value, the first and second distances being distances from corresponding elements in one of the two or more consecutive images/frames, the first distance being smaller than the second distance when the first value indicates a lower output light level than the second value.

7. The method according to claim 5, wherein the outputting the altered video signal comprises adapting the altered video signal to the user definable setting.

8. The method according to claim 5, wherein the generating comprises generating the value intermittently, with a predetermined frequency, or constantly, and the determining comprises determining the position on the basis of the latest received value.

* * * * *